United States Patent [19]
Wenniger

[11] Patent Number: 6,018,785
[45] Date of Patent: *Jan. 25, 2000

[54] INTERRUPT-GENERATING HARDWARE SEMAPHORE

[75] Inventor: Bruce Wenniger, Cupertino, Calif.

[73] Assignee: Cypress Semiconductor Corp., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/617,018

[22] Filed: Mar. 18, 1996

Related U.S. Application Data

[63] Continuation of application No. 08/175,630, Dec. 30, 1993, abandoned.

[51] Int. Cl.[7] .................................................. G06F 9/46

[52] U.S. Cl. ........................ 710/200; 710/260; 710/262

[58] Field of Search ................................. 395/309, 308, 395/726, 735; 710/128, 129, 200, 260, 262

[56] References Cited

U.S. PATENT DOCUMENTS

| | | | |
|---|---|---|---|
| 3,881,174 | 4/1975 | Barnich | 340/172.5 |
| 4,620,118 | 10/1986 | Barber | 327/19 |
| 4,750,116 | 6/1988 | Pham et al. | 395/650 |
| 5,032,982 | 7/1991 | Dalrymple et al. | 395/550 |
| 5,072,365 | 12/1991 | Burgess et al. | 395/725 |
| 5,101,497 | 3/1992 | Culley et al. | 395/725 |
| 5,179,704 | 1/1993 | Jibbe | 395/725 |
| 5,249,154 | 9/1993 | Tai et al. | 365/211 |
| 5,261,107 | 11/1993 | Kilm et al. | 395/725 |
| 5,309,567 | 5/1994 | Mizukami | 395/325 |
| 5,317,747 | 5/1994 | Mochida et al. | 395/725 |
| 5,379,382 | 1/1995 | Work et al. | 395/275 |

OTHER PUBLICATIONS

MicroSoft Press Computer Dictionary p. 354, 1994.

Dictionary of Computers, Information Processing & Telecommunications pp. 561, 603,1987.

Microsoft Press Computer Dictionary Nov. 01, 1993 pp. 32, 192, 193, 220, 221, 373.

Motorola Semiconductor, MCM68HC34, Motorola, Inc., 1984, pp. 1–9.

CMOS Dual–Port RAM 16K (2k×8–bit) with Semaphore, IDT 71322S, Jan. 1989, pp. 53–64.

CMOS Dual–Port RAM 16K (4k×8–bit) with Semaphore, IDT 71342S, Jan. 1989, pp. 87–99.

*Primary Examiner*—Paul R. Myers
*Attorney, Agent, or Firm*—Christopher P. Maiorana, P.C.

[57] ABSTRACT

The hardware semaphore generates an interrupt signal upon a change in ownership status of a shared resource. In particular, the semaphore apparatus generates an interrupt signal when a requesting device or process relinquishes control of a shared resource. By generating a hardware interrupt when a shared resource becomes available, devices or processes that require access to the resource need not repeatedly poll the hardware semaphore to determine if the resource associated with the semaphore is available. In a preferred embodiment, the hardware semaphore apparatus employs a pair of cross-coupled NOR gates for arbitrating between two requesting devices. A pair of rising edge detectors and flip-flops are connected to outputs of the NOR gates for generating the interrupt signal. Other exemplary and illustrative embodiments are described as well.

21 Claims, 6 Drawing Sheets

INTERRUPT-GENERATING HARDWARE SEMAPHORE

This is a continuation of application Ser. No. 08/175,630 filed Dec. 30, 1993 now abandoned.

BACKGROUND OF THE INVENTION

1. Field of the Invention

The invention generally relates to computer systems, and in particular hardware semaphore devices within computer systems.

2. Description of Related Art

Hardware semaphores are employed within computer systems to assist in determining the availability of computer resources such as a memory chip, hard disk drive, or the like, which can only be controlled and accessed by a single requesting device at a time. The hardware semaphore provides a flag or token indicating whether the resource is available such that the requesting device need not attempt to access a resource which is already controlled by another device and is unavailable.

SUMMARY OF THE INVENTION

A general object of the invention is to provide a hardware semaphore apparatus which eliminates the need for processes or devices to poll a hardware semaphore to determine the availability of a resource associated with the semaphore. A particular object of the invention is to provide an improved dual port RAM having such an improved hardware semaphore.

These and other objects of the invention are achieved by the provision of an interrupt means, connected to a hardware semaphore apparatus, for generating an interrupt signal in response to a change in availability of a resource identified by the hardware semaphore apparatus. By generating an interrupt signal in response to a change in the availability of the resource, requesting devices or processes need not repeatedly poll the semaphore to determine the availability. Thereafter, the device or process may perform a write operation to the semaphore apparatus to take the token and thereby gain control over the device.

Numerous implementations of the interrupt means are available consistent with the general principles of the invention. In a preferred embodiment described herein, a dual port static RAM chip is provided with the aforementioned interrupt-generating semaphore apparatus. Method embodiments of the invention are also provided.

DETAILED DESCRIPTION OF THE INVENTION

Figure 1:
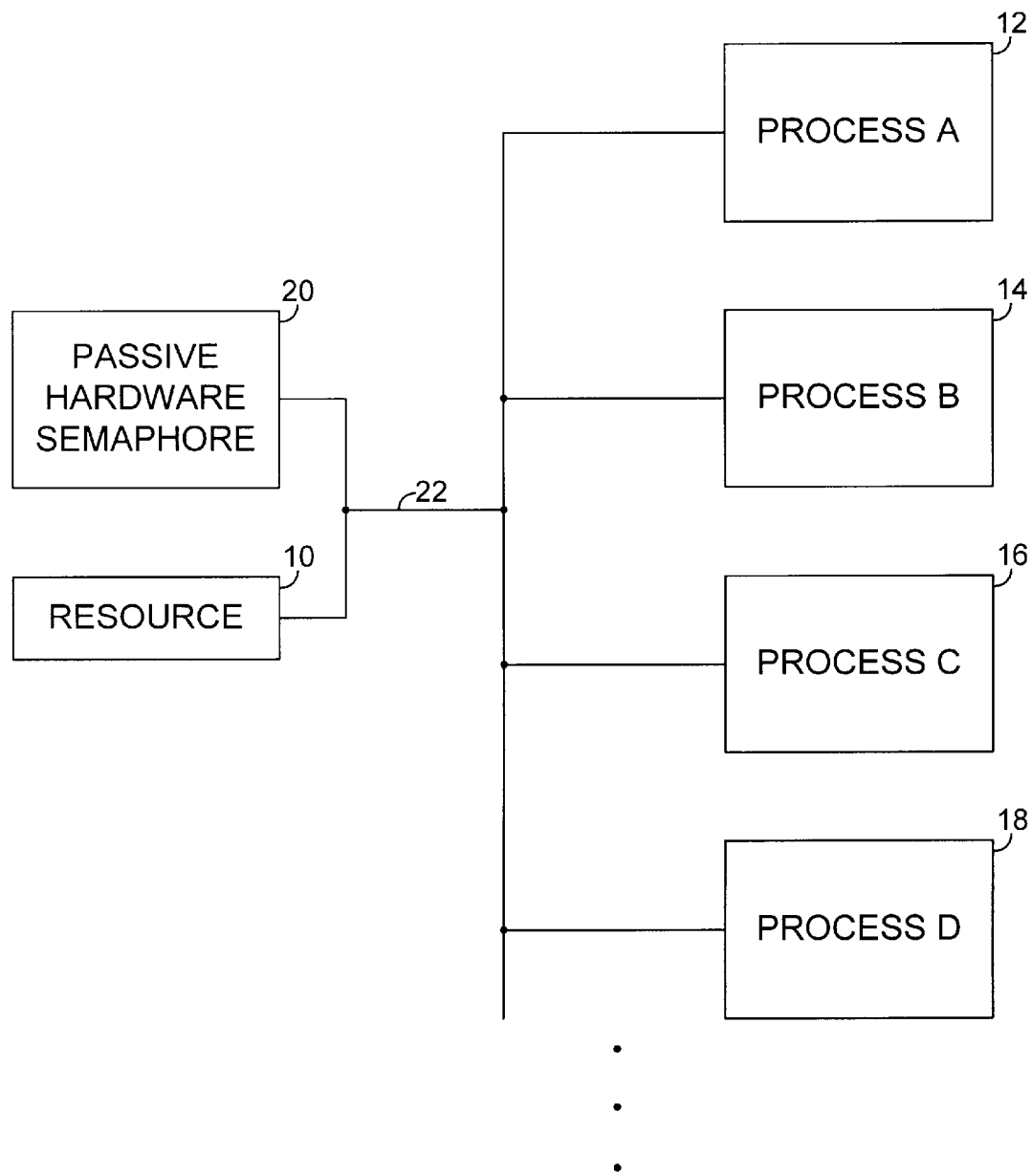
FIG. 1 is a block diagram illustrating, somewhat symbolically, a portion of a computer system employing a passive hardware semaphore in connection with a resource.

FIG. 1 illustrates, at a high level, a hardware semaphore system. In FIG. 1, a resource 10 is accessible by several different processes, Process A, Process B, Process C and Process D, denoted 12, 14, 16 and 18, respectively. The processes may represent physically separate microprocessor devices or may merely represent different software processes generated by a single microprocessor device. As noted above, resource 10 may be a memory chip, hard disk drive, or any of numerous other hardware devices which are accessible by only a single process or device at one time. FIG. 1 also illustrates a "passive" hardware semaphore 20 which is connected both to resource 10 and to an interconnection bus 22 connecting resource 10 with each of Processes A–D. Generally, once one of the requesting Processes A–D establishes control over resource 10, hardware semaphore 20 is controlled to indicate that resource 10 is "busy". Thereafter, other devices or processes, which require accesses to resource 10, poll semaphore 20 to determine whether or not resource 10 is available. Once the process that has control over resource 10 relinquishes control, hardware semaphore 20 is reset to indicate that resource 10 is once again available. Then, when one of the other processes polls semaphore 20, the polling process will determine that the resource is available. At that time, the hardware semaphore is set to indicate that resource 10 is no longer available and the polling process proceeds to access and control resource 10.

Hardware semaphore 20 of FIG. 1 is identified as a "passive" hardware semaphore since it merely passively indicates the availability of resource 10. In other words, a requesting process must repeatedly query or poll semaphore 20 to determine its current state. The requirement that hardware semaphore 20 be polled is wasteful of system resources. In a complex computer system, which may have hundreds of competing processes and thousands of resources, a considerable amount of overall execution time may be wasted by requiring each of the various requesting processes or devices to periodically poll each of the resources for which access is required.

Figure 2:
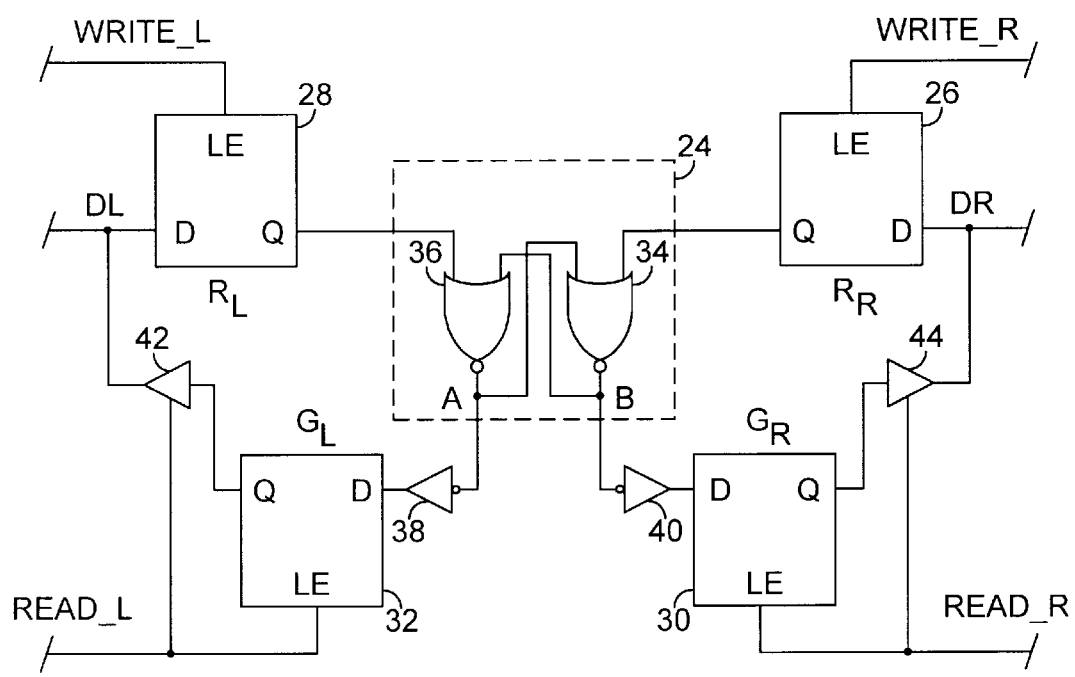
FIG. 2 is a block diagram, partially in schematic form, illustrating a passive hardware semaphore latch cell for use with a dual-ported RAM.

An exemplary hardware semaphore device, a latch cell particularly adapted for use in a dual-port static random access memory (RAM), is illustrated in FIG. 2. The dual-port RAM (not illustrated) includes left and right input ports, through which an external device accesses one of a set of predetermined portions of memory in the RAM. However, each predetermined portion of memory can only be accessed, at a particular time, through either the left port or the right port. In other words, a portion of memory can not be simultaneously accessed through both the left port and the right port. Hence, each predetermined portion of memory is effectively a resource of the type shown symbolically in FIG. 1, which can only be accessed by a single process at a particular time.

For simplicity, FIG. 2 illustrates only a single hardware semaphore which identifies the availability of one portion of memory. In a practical dual-port static RAM chip, a larger number of hardware semaphores may be employed, and, conventionally, at least eight semaphores are provided, thereby allowing the overall memory of the RAM to be subdivided into at least eight separately accessible portions of memory.

The hardware semaphore latch cell of FIG. 2 includes an arbitration unit 24, a pair of request latches 26 and 28 and a pair of grant latches 30 and 32. Request latch 26 is connected to the right port and is identified as $R_R$. Request latch 28 is connected to the left port and is identified as $R_L$. Likewise, grant latches 30 and 32 are respectively connected to the right and left ports and denoted $G_R$ and $G_L$. Each latch includes a D input, a Q output and a latch enable input. As can be seen from FIG. 2, the D inputs of the left and right request latches are connected to left and right data input lines $D_L$ and $D_R$ respectively. Also, the latch enable inputs of the left and right request latches are respectively connected to left and right write enable input lines, respectively.

Arbitration unit 24 includes a pair of cross-coupled NOR gates 34 and 36. Each of NOR gates 34 and 36 includes a pair of inputs and a pair of outputs. A first input of NOR gate 34 is connected to the Q output of left request latch 26. Likewise, a first input of NOR gate 36 is connected to the Q output of left request latch 28. The second input of each of the NOR gates 34 and 36 are cross-coupled to outputs of the NOR gates. In other words, the output of NOR gate 36 is connected to the second input of NOR gate 34 and vice versa. As such, arbitration unit 24 is effectively an unclocked SR flip-flop. The left and right ports of the RAM effectively represent two competing requesting processes.

In FIG. 2, outputs of NOR gates 36 and 34 are identified by nodes A and B, respectively. Node A is connected through an inverter 38 into the D input of left grant latch 32. Node B is connected through a second inverter 40 into the D input of right grant latch 30. Q outputs of the left and right grant latches are connected through amplifiers 42 and 44 respectively onto the left and right data lines, $D_L$ and $D_R$. The latch enable input of the left and right grant latches are connected to left and right read lines, respectively.

Together, the elements of the latch cell of FIG. 2 operate to indicate whether the corresponding resource is controlled by the left port, the right port or is available to either port. In operation, the latch cell of FIG. 2 is initialized such that the Q outputs of the request and grant latches are in a high state corresponding to logical one. As initialized, the semaphore or token is available to either the left or right ports. In the initial state, both inputs to arbitration latch 24 are also high, such that nodes A and B are both low. To determine the availability of the resource associated with the latch, a read of the semaphore is attempted by one of the ports. This is achieved by asserting a high signal on either the left or the right read lines. In the initial state, the low state of nodes A and B ensures that the D inputs of the left and right grant latches are both high. Hence, a read signal asserted at the latch enable input of either the left or the right grant latches causes the high D input to be propagated to the corresponding Q output and ultimately onto the corresponding data output line. Hence, in the initial state, wherein nodes A and B are both low, a read request from either the left or right ports will provide a high output on the corresponding left or right data line, indicating that the resource is available.

Table I illustrates a typical sequence of semaphore operations. The foregoing read sequence, wherein nodes A and B are both low is set forth in the first row of Table I.

TABLE 1

| Operation | Left Port | | Right Port | | Semaphore Status |
|---|---|---|---|---|---|
| | $D_L$ | $R_L$ | $D_R$ | $R_R$ | |
| Idle, no action | 1 | 1 | 1 | 1 | Token Available |
| Right port writes 0 | 1 | 1 | 0 | 0 | Right port has token |
| Left port writes 0 | 1 | 0 | 0 | 0 | Right port keeps token |
| Right port writes 1 | 1 | 0 | 1 | 1 | Right port releases token |
| Left port writes 0 | 0 | 0 | 1 | 1 | Left port gets token |
| Left port writes 1 | 1 | 1 | 1 | 1 | Token Available |

To obtain control over the resource, a requesting process must obtain the semaphore either through the right or left port. To obtain the semaphore through the right port, a WRITE_R signal is asserted by lowering the voltage on the WRITE_R line. Simultaneously, a 0 is asserted along the $D_R$ data line. Since right request latch 36 is enabled by the assertion of the WRITE_R signal, the logic 0 input to the right request latch is propagated through the Q output into NOR gate 34. Hence, a low signal is transmitted into the first input of NOR gate 34 causing node B to go high and node A to stay low. Once node B is high, a low signal is asserted at the D input of grant latch 30. Thereafter, a subsequent attempt to read the value of the semaphore through the right port results in a logic zero output value along the data line, indicating that the right port has control of the resource. While node A is low and node B is high, a read request through the left port results in a logic one output on data line $D_L$, indicating that the resource is not available to the left port.

If the right port has control of the semaphore, and a process attempts to write to the semaphore through the left port, the write attempt will fail to change the status of arbitration unit 24. More specifically, if the left port attempts to write a zero, a low is present on the left data input of the left port request latch 28. While WRITE_L is active the Q output of latch 28 goes low. However, node A is held low since node B is high. Hence, this action does not change the state of arbitration flip-flop 24. The operation wherein the left port attempts to write a zero while the right port has control of the semaphore is illustrated in the third row of Table I.

An attempt to gain control of the semaphore by writing a zero to the semaphore, followed by an immediate read operation to determine whether the write operation was successful, represents the aforementioned polling operation. As noted above, such polling is performed periodically until the write attempt to the semaphore is successful.

Continuing with the operations illustrated in the Table I, the right port releases the token by asserting the WRITE_R signal line while providing a 1 on the $D_R$ data line. Such action causes the D output of the write request latch to go to a high state which in turn causes node B to go low, but node A stays low. Thereafter, if a process attempts to gain access to the resource through the left port by writing a zero to the semaphore, the operation will result in a high on node A. The high on node A in turn causes a low on the D input on the left port grant latch to be propagated to the Q output when READ_L is active, thus causing the left data line to go low, indicating that the semaphore is available. In other words, if a process tries to either read or to write to the semaphore after the right port has released the token, the output signal along the left data line will indicate that the token is available. If the left port has gained control of the token, subsequent reads or writes through the right port will result in a high signal along the right data line, indicating that the token is unavailable to the right port. The left port relinquishes the semaphore by writing a 1, in the same manner as described above with reference to the right port relinquishing the semaphore. By writing a 1, the D output of the left request latch goes high, causing node A to go low, and thereby returning the arbiter to the idle state, i.e., nodes A and B both low.

Although the latch cell of FIG. 2 provides arbitration between the left and right port for control of a resource (within the RAM or associated with the RAM), a determination of the availability of the resource requires repeated polling which, depending upon general resource availability, may result in considerable inefficiencies.

As noted above, practical implementations of hardware semaphores typically include eight individual semaphores. Thus, for the implementation of FIG. 2, a total of eight arbitration units along with eight corresponding sets of left and right grant latches are provided. Typically, the data lines of the eight latch cells are interconnected such that a read request to one of the latch cells results in either a 1 or a 0 being asserted to all eight data lines. Likewise, an attempt to write to one of the eight individual semaphores is achieved by placing a 0 or 1 on all of the data lines. In such an embodiment, addressing circuitry, not shown, is provided to ensure that the write is only performed on one of the eight semaphores. Although each of the eight semaphores are individually addressable, two semaphores cannot be written to or read from simultaneously. Hence, only a single read or write request can be accommodated at a time. The addressing circuitry and any circuitry necessary to actually read and write to the resource itself will not be described in detail herein.

The foregoing example illustrates a semaphore latch cell for use in a dual-ported RAM, wherein the resource associated with the semaphore may represent, or be associated with, a portion of memory within the RAM. As noted above, semaphores are commonly used in a wide variety of hardware systems for providing an indication of the availability of a resource.

Figure 3:
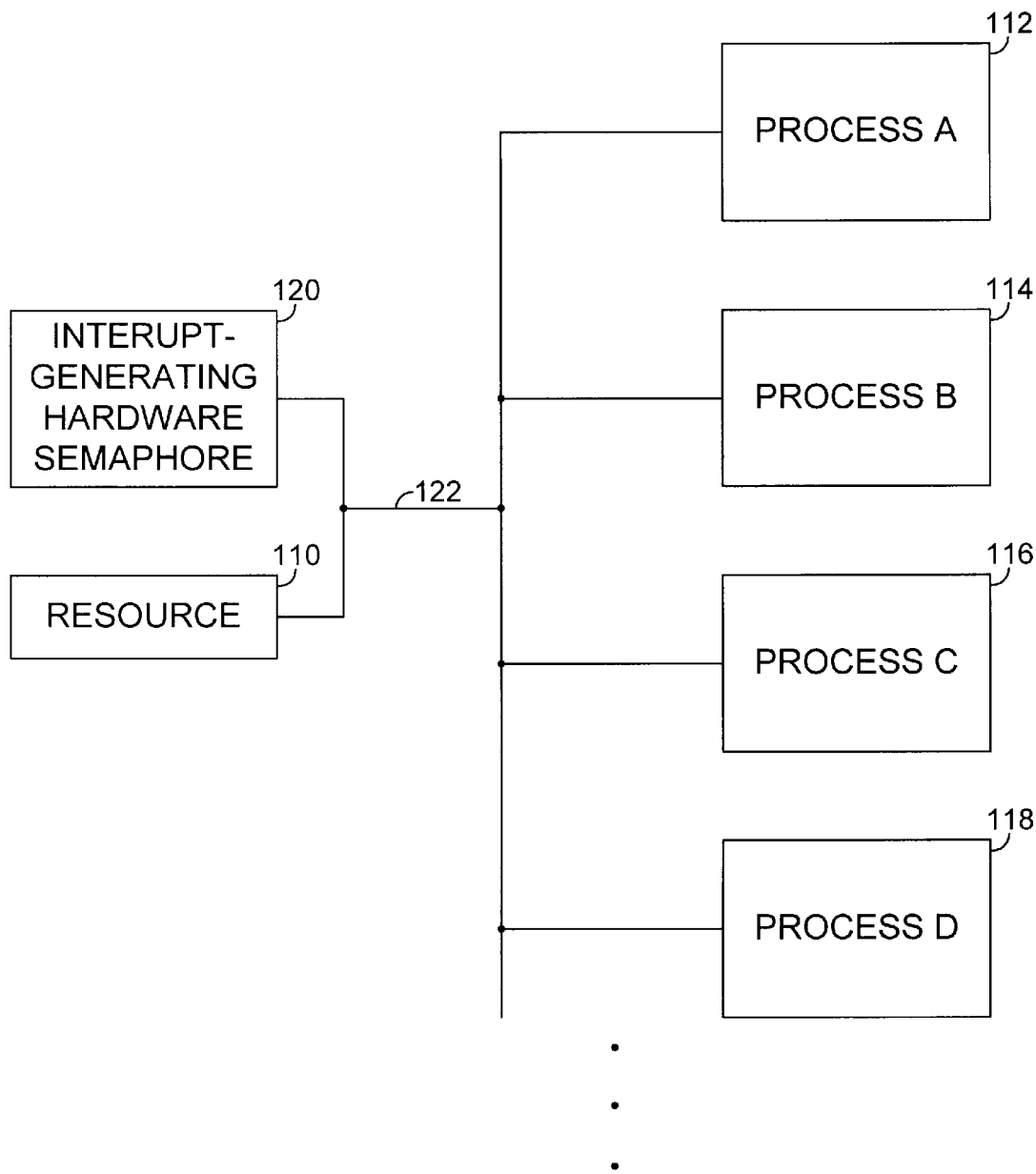
FIG. 3 is a block diagram illustrating, somewhat symbolically, of a portion of a computer system configured in accordance with the invention, having an interrupt-generating hardware semaphore for use in indicating the availability of a shared resource.

Referring to the remaining figures, preferred embodiments of the invention will now be described. Referring first to FIG. 3, a portion of the computer system is shown which includes a resource 110 which is subject to access by one of a set of processes 112, 114, 116 and 118, identified as Process A, Process B, Process C, and Process D, respectively. Also illustrated is a interrupt-generating hardware semaphore 120 connected to resource 110 and to each of Processes 112–118 via a bus line 122.

As with the system illustrated in FIG. 1, resource 110 of FIG. 3 may be any type of shared computer resource which may be accessed by only one or a limited number of processes or devices at a single time. Resource 110 may, for example, be a storage device such as a RAM chip, or any of a wide variety of other hardware or software devices. As far as software devices are concerned, resource 110 may represent a portion of a data table or a section of executable, self-modifiable, computer code. Processes 112–118, may be any type of hardware device, such as a microprocessor, capable of accessing resource 110. Alternatively, Processes 112–118 may merely represent software processes generated by a single microprocessor. The details of the structure and operation of resource 110 and of Processes 112–118 will not be described in detail herein. Rather, the remainder of this description of the invention primarily describes the structure and operation of interrupt-generating hardware semaphore 120.

As noted, two or more of Processes 112–118 may simultaneously compete for access to, or control of, resource 110. Hardware semaphore 120 maintains information indicating whether resource 110 is available or whether it is currently controlled by one of competing Processes 112–118. However, unlike the passive hardware semaphore of FIG. 1, which merely maintains a value which must be polled by a requesting process, hardware semaphore 120 of FIG. 3 generates an interrupt upon any change in status of resource 110, thereby minimizing, or eliminating, the need for a requesting process to poll the semaphore to determine the availability of resource 110. Thus, for example, if Process A has control of resource 110, and Process B simultaneously seeks control over resource 110, Process B may await receipt of an interrupt from hardware semaphore 120, indicating that control of resource 110 has been relinquished. Thereafter, Process B can attempt to control Process 110. In one implementation, the processor seeking control over resource 110 initially queries hardware semaphore 120 to determine if the resource is available and, if the resource is unavailable, the process then awaits receipt of an interrupt signal.

In a practical system, a large number of shared resources may be present, each having an interrupt hardware semaphore. In such case, each hardware semaphore may generate a unique interrupt, such that a requesting processes receiving an interrupt signal can determine whether the interrupt corresponds to a specific request device, or each hardware semaphore may merely generate a general interrupt. With a general interrupt, a requesting device, upon receiving the interrupt, must query the semaphore of the specific resource that it seeks access to before the process can determine whether the interrupt received corresponds to the requested resource. Even where unique interrupts signals are generated, the receipt of an interrupt signal from a particular resource may not provide a guarantee that a resource will be available at the time the requesting process re-attempts to gain control of the resource. For example, two or more processes may be awaiting access to a particular resource. One of the processes may gain control of the resource, following receipt of the unique interrupt signal before the other process has a chance to gain control of the resource.

Although receipt of the interrupt signal from an interrupt-generating hardware semaphore may not necessarily guarantee that the resources is available, the generation of such interrupts minimizes or eliminates the need to repeatedly poll the semaphore associated with the desired device. In a practical system having hundreds or thousands of resources being accessed by perhaps tens or hundreds of requesting processes or devices, the general elimination or minimization of the need to poll the various resources can greatly enhance overall processing efficiency.

Figure 4:
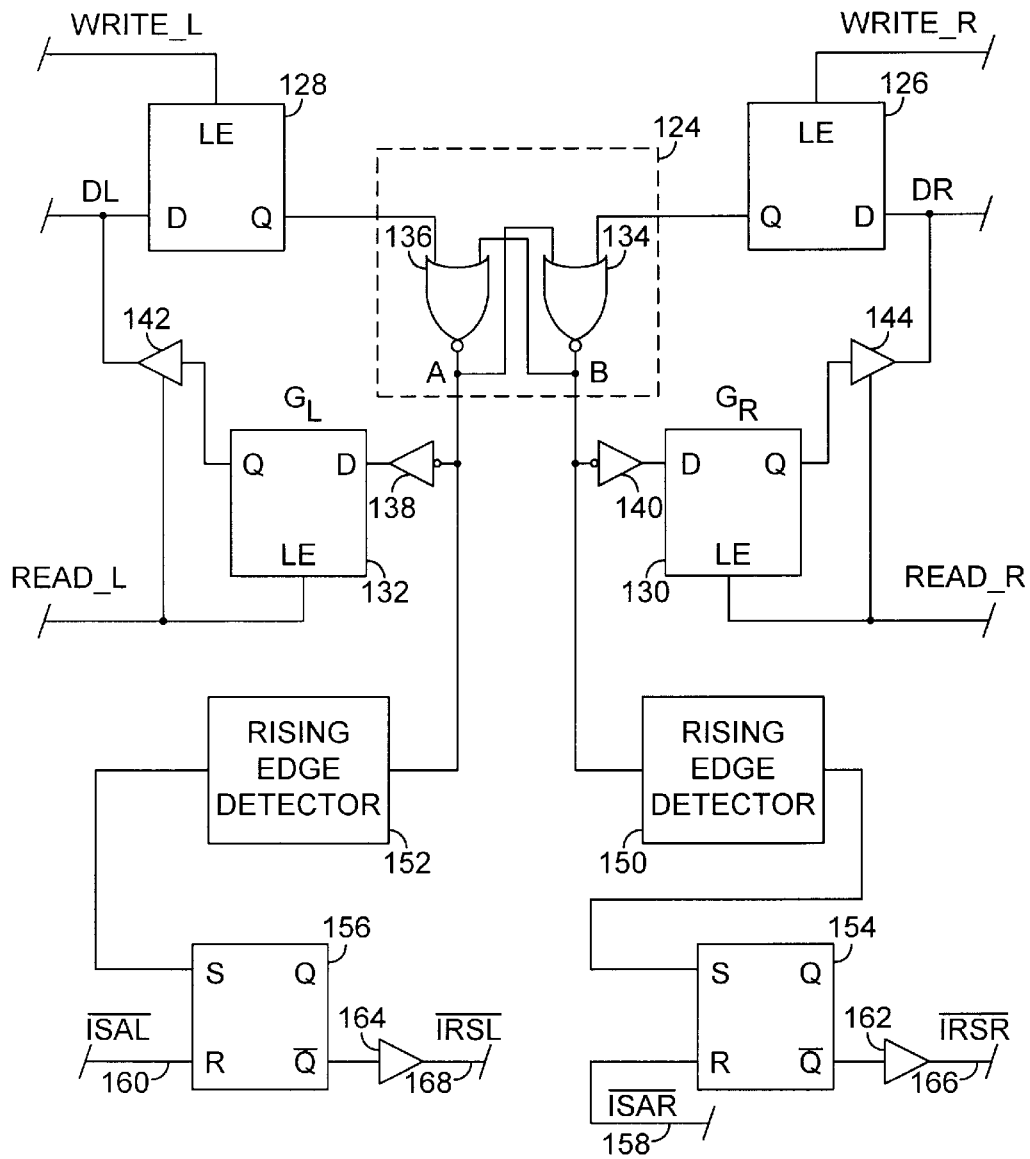
FIG. 4 is a schematic of the interrupt-generating hardware semaphore of FIG. 3 configured for use with a dual-ported RAM.

In the remaining figures, specific implementations of hardware semaphore 120 will be described. FIG. 4 illustrates one possible implementation of the interrupt-generating hardware semaphore of FIG. 3. In particular, FIG. 4 illustrates a semaphore latch cell for use with a dual-ported RAM (not shown). Like the latch cell of FIG. 2, the latch cell of FIG. 4 includes an arbitration flip-flop 124 connected to a pair of right and left request latches 126 and 128, respectively, and to a pair of right and left grant latches, 130 and 132, respectively. Flip-flop 124, which operates as an arbitration unit, includes cross-coupled NOR gates 134 and 136. NOR gates 134 and 136 are interlinked in the same manner as corresponding NOR gates of FIG. 2. More specifically, first inputs of NOR gates 134 and 136 are connected to Q outputs of latches 126 and 128, respectively.

An output of NOR gate 134 is connected to a second input of NOR gate 136. Likewise, an output of NOR gate 136 is connected to a second input of NOR gate 134.

Request latches 126 and 128 also each include D inputs and latch enable (LE) ports. The D inputs of latches 126 and 128 are connected to DR and DL output lines, respectively. The LE ports of latches 126 and 128 are also connected to WRITE_R and WRITE_L inputs lines, respectively.

The output of NOR gate 134 is connected through an inverter 140 into a D input of grant latch 130. Likewise, the output of NOR gate 136 is connected through an inverter 138 into a D input of grant latch 132. Grant latches 130 and 132 also both include Q output ports connected through amplifiers 142 and 144 to the DL and DR output lines, respectively. Grant latches 130 and 132 also both include latch enable (LE) ports connected to READ_R and READ_L input lines, respectively.

The elements thus far described in FIG. 4, correspond to elements set forth in FIG. 2 and the function and operations of the elements, already described with reference to FIG. 2, will not be repeated herein. However, unlike the latch cell of FIG. 2, the latch cell of FIG. 4 includes additional circuitry connected to outputs of the cross-coupled NOR gates. Specifically, rising edge detectors 150 and 152 are connected to outputs of NOR gates 134 and 136, respectively. An S input of an RS flip-flop 154 is connected to an output of rising edge detector 150 and a similar RS flip-flop 156 has an S input connected to an output of rising edge detector 152. Both of RS flip-flops 154 and 156 also include R reset ports connected to reset lines 158 and 160 for receiving inverted interrupt semaphores acknowledge right (ISAR) signal and inverted interrupt semaphore acknowledge left (ISAL) signals, respectively. Finally, an amplifier 162 is connected to a complementary Q output of RS flip-flop 154. An amplifier 164 is connected to a complementary Q output of RS flip-flop 156. An interrupt signal is output from amplifier 162 along a line 166. The interrupt signal is identified in FIG. 4 as an inverted interrupt request semaphore right (IRSR) signal. An interrupt signal is output from amplifier 164 along an output line 168 and is identified in FIG. 4 as an inverted interrupt request semaphore left (IRSL) signal. It should be noted that the reset signals received through the R ports of RS flip-flops 154 and 156 are asynchronous reset signals received from a processor or other device controlling and accessing the semaphore latch cells.

The RS flip-flops are provided to keep the interrupt request active until acknowledged. When any of the semaphores are relinquished, for which a request is pending, rising edge detector 150 or 152 generates a low-going pulse, which is inverted by a NAND gate within the rising edge detector, and which causes the Q output of the RS flip-flop to go high and the $\overline{Q}$ output to go low, generating the interrupt ($\overline{IRSL}$, $\overline{IRSR}$). The RS flip-flops are reset by the respective acknowledge from the processor (ISAL, ISAR) and are initialized in the reset (Q low) state.

As noted above with reference to the description of the arbitration unit of FIG. 2, nodes A and B of the arbitration unit toggle between low and high states as a result of the change in the ownership status of the resource corresponding to the latch cell. For example, if a device or process has control of the resource through the right port of the RAM, then relinquishes control of that resource, nodes A and B toggle between high and low states, accordingly.

A typical sequence of semaphore operations is provided in Table II. Table II provides the same operations described above with reference to Table I, but also includes the actual states of nodes A and B.

TABLE 2

| Operation | Left Port | | | Right Port | | | Semaphore Status |
|---|---|---|---|---|---|---|---|
| | $D_L$ | $R_L$ | A | $D_R$ | $R_R$ | B | |
| Idle, no action | 1 | 1 | L | 1 | 1 | L | Token Available |
| Right port writes 0 | 1 | 1 | L | 0 | 0 | H | Right port has token |
| Left port writes 0 | 1 | 0 | L | 0 | 0 | H | Right port keeps token |
| Right port writes 1 | 1 | 0 | H | 1 | 1 | L | Right port releases token |
| Left port writes 0 | 0 | 0 | H | 1 | 1 | L | Left port gets token |
| Left port writes 1 | 1 | 1 | L | 1 | 1 | L | Token Available |

The sequence of operations set forth Table II correspond to operations also shown in Table I and these operations will not be redescribed in detail.

Rising edge detectors 150 and 152 respond to a low to high signal transition on nodes B and A, respectively. For example, if node B switches from low to high, rising edge detector 150 detects that transition and generates a short pulse, which is received by the S input of RS flip-flop 154, causing flip-flop 154 to output a interrupt signal upon an output interrupt line 166. Likewise, a low to high transition on node A causes rising edge detector 152 to generate a pulse which is transmitted to the S input of RS flip-flop 156 resulting in an interrupt signal generated along interrupt output line 168.

As can be seen from Table II, low to high transitions on either nodes A or B occur as a result of one of the ports relinquishing the token associated with the semaphore. For example, a low to high transition occurs on node B when the right port gains control of the token between lines one and two of Table II. A low to high transition occurs at node A when the right port releases the token. As noted, each low to high transition results in an interrupt signal being sent out on the corresponding interrupt line. Thus, a low to high transition on node B results in an interrupt signal being sent out along interrupt line 166. A low to high transition at node A results in an interrupt signal being sent out along interrupt line 168. By providing for an interrupt signal along interrupt line 168 when the right port releases the token and by providing an interrupt signal along line 166 when the left port releases the token, the port lacking the token receives the interrupt signal indicating that the other port has relinquished the token. Thus, any external device attempting to gain access to the resource through either the left or the right ports likewise receives an appropriate interrupt signal. It should be noted, however, that low to high transitions on the nodes can also occur as a result of a port taking a token. For example, an interrupt signal is generated along interrupt line 166 as a result of the right port taking control of the token, as set forth between lines one and two of Table II. Such an interrupt may be useful in providing verification through the right port that control for the token has been successful.

Interrupt lines 166 and 168 may be connected to dedicated pins on the RAM chip incorporating the semaphore latch cell of FIG. 4. Such interrupt pins may be connected through busses or other signal lines to other elements within the computer system in accordance with conventional interrupt processing techniques.

Figure 5:
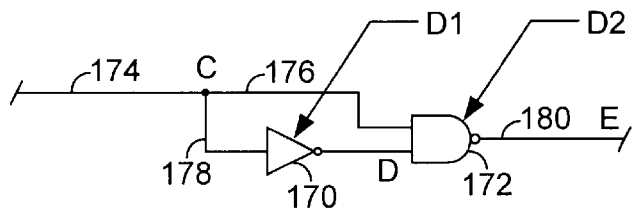
FIG. 5 is a circuit schematic for a rising edge detector of the hardware semaphore circuit of FIG. 4.

FIG. 5 illustrates a possible circuit for use in implementing rising edge detector 150 or 152. The rising edge detector circuit of FIG. 5 includes an inverter 170 and a NAND gate 172. An input line 174 (connected to either node A or node B of FIG. 4) is split into two lines 176 and 178. Inverter 170 is connected along line 178 with an output of inverter 170 connected as a first input to NAND gate 172. Line 176 is connected to a second input of NAND gate 172. A single output line 180 of NAND gate 172 is connected into the S input of one of the RS flip-flops of FIG. 4. NAND gate 172 provides a delay of "d2". In general, d1 must be greater than d2, although there may be possible implementations where such is not necessary. Thus, any signal received along line 174 having a low to high transition is first inverted, then combined with the non-inverted signal by NAND gate 172 to yield a single output pulse.

Figure 6:
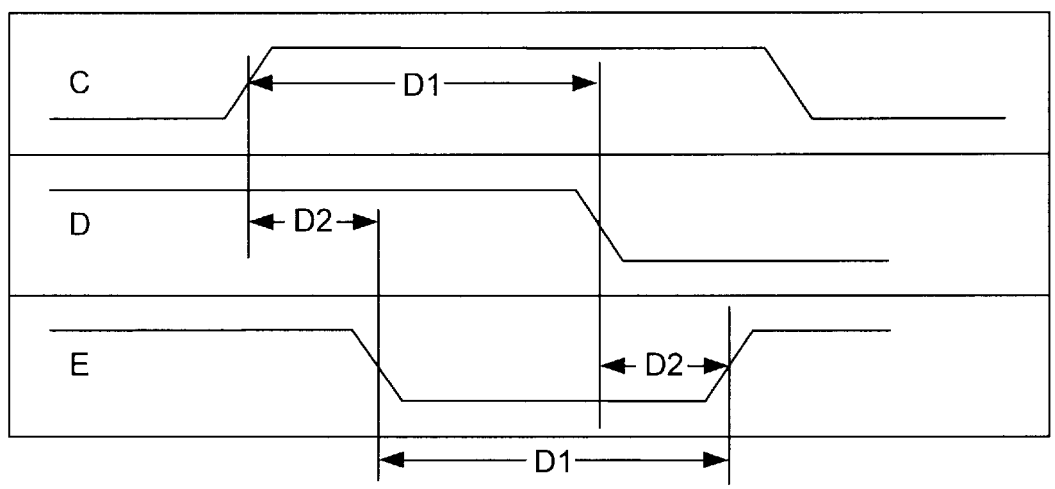
FIG. 6 is a timing diagram for the rising edge detector circuit of FIG. 5.

Three nodes C, D, and E are illustrated in FIG. 5. FIG. 6 provides a timing diagram for signal wave forms occurring at nodes C, D, and E. Inverter 170 provides a delay of "d1". FIG. 6 illustrates the states of signals at nodes C, D, and E for exemplary delay periods d1 and d2. As can be seen, node C initially receives a low to high transition from the arbitration unit of FIG. 4. Inverter 170 inverts the low to high transition, subject to a time delay of d1. The resulting high to low transition is illustrated along line D of FIG. 6. NAND gate 172 initially responds to the low to high transition received along line 176 to produce a high to low transition, subject to a time delay of d2. NAND gate 172 then outputs a low to high transition in response to the high to low transition received along line 178, subject to a further time delay of d2. As a result, an output of NAND gate 172 provides a short low-going pulse. The short low-going pulse, line E of FIG. 6, is the clock from which the interrupt pulse is generated as described with reference to FIG. 4.

Although the circuitry of FIG. 5 illustrates a preferred implementation of the rising edge detector, other possible implementations may alternatively be employed. The rising edge detector of FIG. 5 is preferred, in part, because it includes circuitry exploiting delaying or integrating techniques, as opposed to differentiating techniques to generate pulses.

What has been described with reference to FIGS. 4–6 is one exemplary implementation of an interrupt-generating hardware semaphore device having a single arbitration unit for arbitrating requests to a single resource. As can be appreciated, a typical device such as a dual-ported RAM may be provided with a number of separate latch cells for independently arbitrating resource requests to several separate resources within the RAM. For example, the total memory space within the RAM may be subdivided into a set of eight sections, with each section representing a separate resource. A separate latch cell may be provided for arbitrating access to each of the memory portion resources. Each such semaphore latch cell may be configured as shown in FIG. 4 with separate interrupts being generated as a result in change in status of each respective resource.

Alternatively, the semaphore latch cells may be combined to provide only a single interrupt signal in response to a change in status to any one of the eight resources. Such an implementation is desirable to minimize the amount of circuitry required to implement the semaphores and, in particular, to limit the number of dedicated pins required to output the semaphore interrupt.

Figure 7:
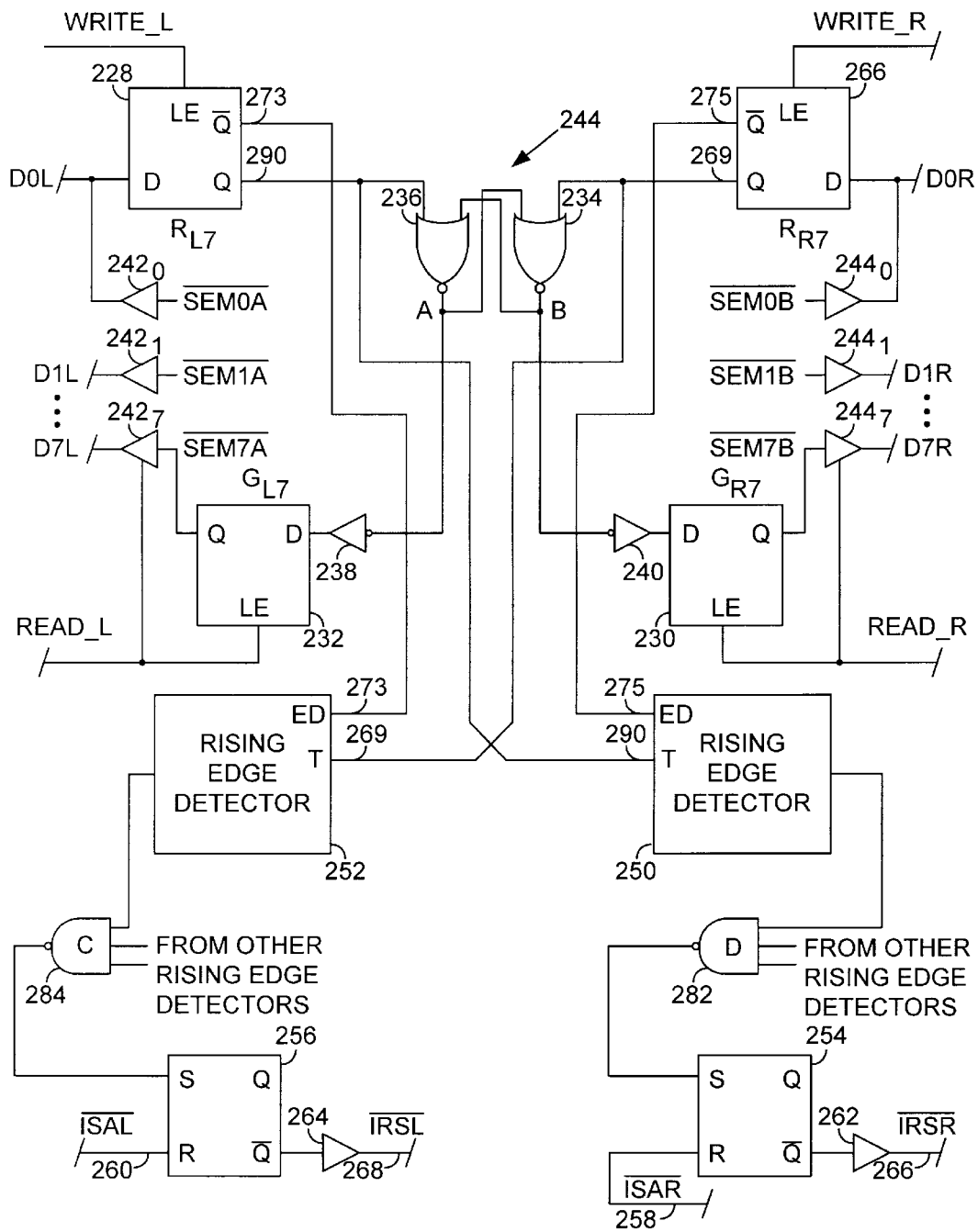
FIG. 7 is a schematic for an alternative embodiment of the hardware semaphore of FIG. 3.

One possible implementation of such a combined semaphore latch cell is set forth in FIG. 7. FIG. 7 illustrates only a portion of the overall eight bit semaphore latch cell. A total of eight separate semaphore latch cells are provided with each cell including an arbitration unit, a pair of request latches, a pair of grant latches, and a pair of rising edge detectors. Only one latch cell is illustrated in FIG. 7. However, the outputs of the rising edge detectors of each of the eight latch cells are combined, as shown, using NAND gates.

Most elements of the combination eight bit latch cell of FIG. 7 are identical to elements of the single bit latch cell of FIG. 4 and like reference numerals are employed in FIG. 7, with reference numerals incremented by 100.

A NAND gate 282 is connected to rising edge detector 250 and to seven other rising edge detectors of seven other semaphore latch cells (not shown). A NAND gate 284 is connected to rising edge detector 252 and to seven other corresponding rising edge detectors of the seven other semaphore latch cells. Although a total of eight latch cells are provided, only a single pair of clocked RS flip-flops 254 and 256 are provided. By using a NAND gate to combine signals from eight rising edge detectors and by employing only a single pair of RS flip-flops, a single interrupt signal is generated for a low to high transition of any of the nodes of the eight semaphore latch cells. Hence, a change in status in any of the eight associated resources results in a single interrupt signal. Thus, a device receiving an interrupt is not guaranteed that the particular resource desired by the device is available. Rather, the requesting device must then attempt to access the desired resource to determine whether that particular resource is available. Nevertheless, a substantial advantage is gained since the requesting device need not repeatedly poll the semaphore associated with the desired resource. Hence, only one pair of interrupt lines 266 and 268 are required to output interrupts from any of the eight latch cells associated with the eight resources.

FIG. 7 also illustrates that the data outputs for the eight latch cells may be combined. As can be seen, Q outputs of left and right grant latches 230 and 232 are combined with each of the Q outputs of the seven other latch cells via parallel coupled amplifiers $244_0$–$244_7$ and $242_0$–$242_7$. In this manner, each of eight right output data lines (D0R–D7R) output a semaphore, SEM0B . . . SEM7B. Likewise, each of the eight left output data lines (D0L–D7L) output a semaphore, SEM0A . . . SEM7A. For example, if a device queries arbitration unit 224 through the right port to determine the availability of the associated resource, a 1 or 0 signaling the availability of the resource is output independently on each of the eight right output lines (D0R–D07). It should be noted that although data output signals are simultaneously provided along all eight output lines, each of the eight arbitration units (only one of which is shown) operates independently. In this manner, the eight separate resources may be tracked independently by the eight arbitration units, and the eight output lines are independent and are simultaneously accessed to query the eight arbitration units. Again, this combination of elements is provided to minimize the number of resources required while still providing for an acceptable semaphore processing capability.

As previously described, the positive edge detector circuit of FIG. 5 causes a pulse to be generated when the requesting port obtains the semaphore, even if the other port does not have a request pending. This will cause an interrupt to be generated to the port obtaining the semaphore. In certain applications, this feature may be useful. For example, generating the interrupt acknowledges that the semaphore has been successfully obtained, although such an acknowledgment could also be obtained by having the requesting port read the semaphore to verify that the semaphore provides a zero.

Figure 8:
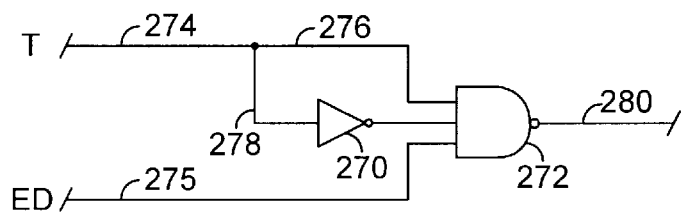
FIG. 8 is a circuit schematic of an alternative embodiment of the rising edge detector of FIG. 5.

The embodiment of FIG. 7 includes an alternative rising edge detector that does not cause a negative pulse to be generated if the low to high transition of either node A or node B is due to the semaphore being granted to the port requesting the semaphore. The modified rising edge detector circuit, shown in FIG. 8, is similar to the circuit of FIG. 5 but includes a three-input NAND gate 272 rather than a two-input NAND gate. A third input of NAND gate 272 is connected to the $\overline{Q}$ output of a respective semaphore request latch along a line 275 for the right port and a line 273 for the left port (FIG. 7). The input received along line 275 of FIG. 8 is identified as an enable detector input (ED). Input line 274 is identified as a T input in FIG. 8. Rising edge detectors 250 and 252 of FIG. 7 have input ports marked accordingly.

With the interconnections as shown NAND gate 272 for the right port is enabled if and only if there is a request pending for the right port, i.e., line 275 is high. When the left port relinquishes the semaphore, line 290 transitions from low to high and triggers edge detector 250.

In a similar manner, if there is a request pending for the left port, line 273 is high. When the right port relinquishes the semaphore, line 269 transitions from low to high and triggers edge detector 252.

Alternatively, the rising edge detector employed within the embodiment of FIG. 7 may be same of that used for the embodiment of FIGS. 3–6, in which cases connection lines 269 and 271 are not required.

What has been described are preferred and exemplary embodiments of an interrupt-generating hardware semaphore apparatus. Although the invention has been described with respect to these preferred and exemplary embodiments, such are provided primarily to illustrate the invention and the scope of the invention should not be limited to the particular implementations described herein. Rather, a wide range of different implementations and applications may be employed consistent with the invention. Certain objects and advantages of the invention have been described herein. Other objects and advantages also achieved in connection with the invention.

What is claimed is:

1. An apparatus comprising:

a first port;

a second port;

a resource coupled to said first port and said second port, accessible through at least one of said first port and said second port by a plurality of processes, wherein only one of the processes can access the resource at any one time;

a hardware semaphore configured to store a value indicating the availability of said resource to the plurality of processes, said hardware semaphore comprising (i) a first and a second read latch and (ii) a plurality of output latches each having a data input, an output and a latch enable input, wherein an output of the hardware semaphore is connected to the input of a respective output latch, and an output of each output latch connected to the input of a respective read latch; and an interrupt circuit, connected to said hardware semaphore and said plurality of processes, said interrupt circuit generating an interrupt in response to a change in the availability of said resource as represented by the value stored in the hardware semaphore.

2. The apparatus of claim 1, wherein:

said hardware semaphore includes an arbiter for arbitrating access requests between said plurality of processes, said arbiter generating a signal in response to a change in the availability of the resource; and said interrupt circuit includes a signal detector for detecting said signal and generating said interrupt in response thereto.

3. The apparatus of claim 2, wherein said arbiter generates a signal having a rising edge in response to a change in availability of the resource, and wherein said interrupt circuit comprises:

a rising edge detector generating a pulse in response to said rising edge signal; and an RS flip-flop having an R input connected to a reset line and an S input connected to an output of said rising edge detector, said RS flip-flop generating an interrupt signal upon receiving said pulse through said S input.

4. The apparatus of claim 3, wherein said rising edge detector comprises:

an inverter receiving said rising edge signal; and a NAND gate having a first input receiving said rising edge signal and having a second input receiving an output of said inverter.

5. The apparatus of claim 2, further comprising a plurality of said semaphores, each having an arbiter, and wherein said interrupt circuit comprises:

a plurality of said signal detectors, each connected to a respective arbiter; and a logic gate combining signals received from said plural of signal detectors and generating a single interrupt in response to signals received from any or all of said signal detectors.

6. The apparatus of claim 2, wherein said arbiter comprises a pair of cross-coupled NOR gates, with said interrupt circuit connected to an output of said pair of cross-coupled NOR gates.

7. The apparatus of claim 1, wherein said semaphore comprises:

first and second read latches each having a data input, an output, and an enable input; and a pair of cross-coupled NOR gates, each NOR gate having a first input connected to an output of a respective read latch and a second input connected to an output of the other NOR gate.

8. The apparatus of claim 7, wherein said interrupt circuit comprises:

a first rising edge detector connected to an output of one of said NOR gates for detecting a first rising edge signal;

a second rising edge detector connected to an output of the other of said NOR gates for detecting a second rising edge signal;

a first RS flip-flop having an R input connected to a reset line and an S input connected to an output of said first rising edge detector; and a second RS flip-flop having an R input connected to a reset line and an S input connected to an output of said second rising edge detector.

9. The apparatus of claim 1, wherein said semaphore includes a plurality of arbiters generating first and second rising edge signals in response to a change in the availability of a plurality of said resources, and wherein said interrupt circuit includes:

a plurality of first rising edge detectors, each connected to a respective one of said semaphores, detecting a first rising edge signal;

a first logic gate, connected to each of said first rising edge detectors, generating a signal in response to a combination of outputs from said first rising edge detectors;

a first flip-flop having an input connected to a reset line and an S input connected to an output of said first logic gate;

a plurality of second rising edge detectors, each connected to a respective one of said semaphores, detecting a second rising edge signal;

a second logic gate, connected to each of said second rising edge detectors, generating a signal in response to a combination of outputs from said second rising edge detectors; and a second flip-flop having an input connected to a reset line and an S input connected to an output of said second logic gate.

10. A method, comprising the steps of:

storing a value in a hardware semaphore indicating the availability of a resource to a plurality of processes, said resource being accessible by said plurality of processes through at least one of a first port and a second port, wherein only one of the processes can access the resource at any one time;

generating an interrupt signal in response to a change in the availability of the resource as represented by the value stored in the hardware semaphore, said hardware semaphore comprising (i) a first and a second read latch and (ii) a plurality of output latches each having a data input, an output and a latch enable input, wherein an output of the hardware semaphore is connected to the input of a respective output latch, and an output of each is output latch connected to the input of a respective read latch; and transmitting said interrupt signal to the plurality of processes.

11. The method of claim 10, wherein:

said step of storing a value includes the steps of:
arbitrating access requests from said plurality of processes, and
generating an availability indication signal in response to a change in the availability of the resource; and said step of generating an interrupt signal includes the steps of:
detecting said availability indication signal, and
generating said interrupt in response thereto.

12. The method of claim 11, wherein said signal is a rising edge signal, and wherein said step of generating an interrupt signal comprises the steps of:

generating a pulse in response to said rising edge signal; and passing said pulse into an S input of an RS flip-flop having an R input connected to a reset line, said flip-flop generating an interrupt signal upon receiving said pulse through said S input.

13. The method of claim 12, wherein said step of generating a pulse comprises the steps of:

passing the rising edge signal through an inverter;

passing said rising edge signal through a first input of a NAND gate; and passing an output of said inverter through a second input of said NAND gate.

14. A method, comprising the steps of:

accessing a hardware semaphore connected to a resource to determine if the resource is available, said resource being accessible by a plurality of processes through at least one of a first port and a second port, wherein only one of the processes can access the resource at any one time, said hardware semaphore comprising (i) a first and a second read latch and (ii) a plurality of output latches each having a data input, an output and a latch enable input, wherein an output of the hardware semaphore is connected to the input of a respective output latch, and an output of each output latch connected to the input of a respective read latch;

if available, immediately accessing the resource; and if not available, deferring access pending receipt of an interrupt signal generated in response to an indication by the hardware semaphore of the availability of the resource, then again attempting to access the resource.

15. An apparatus comprising:

a random access memory;

a hardware semaphore, connected to the random access memory, storing a value indicating an availability state of the random access memory; and an interrupt circuit, connected to the hardware semaphore, the interrupt circuit automatically generating an interrupt in response to a change in the availability state of the random access memory as represented by a value stored in the hardware semaphore, the interrupt being transmitted to a plurality of other resources, processes and/or devices, said hardware semaphore comprising (i) a first and a second read latch and (ii) a plurality of output latches each having a data input, an output and a latch enable input, wherein an output of the hardware semaphore is connected to the input of a respective output latch, and an output of each output latch connected to the input of a respective read latch.

16. The apparatus of claim 1, wherein said resource is accessible by at least a first one of said plurality of processes through said first port and by at least a second one of said plurality of processes through said second port.

17. The apparatus of claim 1, wherein said resource is a computer resource.

18. The apparatus of claim 1, wherein said resource comprises a rnemory or hard disk drive.

19. The apparatus of claim 15, wherein said random access memory further includes a first port and a second port.

20. The apparatus of claim 15, wherein said random access memory is accessible by at least a first one of said plurality of resources, processes and/or devices through said first port and by at least a second one of said plurality of resources, processes and/or devices through said second port.

21. An apparatus comprising:

a first port;

a second port;

a resource coupled to said first port and said second port, accessible through at least one of said first port and said second port by a plurality of processes, wherein only one of the processes can access the resource at any one time;

a hardware semaphore storing a value indicating the availability of said resource to the plurality of processes, said semaphore includes a plurality of arbiters configured to generate first and second rising edge signals in response to a change in the availability of said resources; and an interrupt circuit, connected to said hardware semaphore and said plurality of processes, said interrupt circuit generating an interrupt in response to a change in the availability of said resource as represented by the value stored in the hardware semaphore, said interrupt circuit including (i) a plurality of first rising edge detectors, each connected to a respective one of said semaphores, detecting a first rising edge signal, (ii) a first logic gate, connected to each of said first rising edge detectors, generating a signal in response to a combination of outputs from said first rising edge detectors, (iii) a first flip-flop having an input connected to a reset line and an S input connected to an output of said first logic gate, (iv) a plurality of second rising edge detectors, each connected to a respective one of said semaphores, detecting a second rising edge signal, (v) a second logic gate, connected to each of said second rising edge detectors, generating a signal in response to a combination of outputs from said second rising edge detectors, and (vi) a second flip-flop having an input connected to a reset line and an S input connected to an output of said second logic gate.

* * * * *